3,281,663
OPTICALLY PUMPED MAGNETOMETER USING MICROWAVE TRANSITIONS
Maurice Arditi, Clifton, N.J., assignor to International Telephone and Telegraph Corporation, Nutley, N.J., a corporation of Maryland
Filed Oct. 13, 1964, Ser. No. 403,534
6 Claims. (Cl. 324—.5)

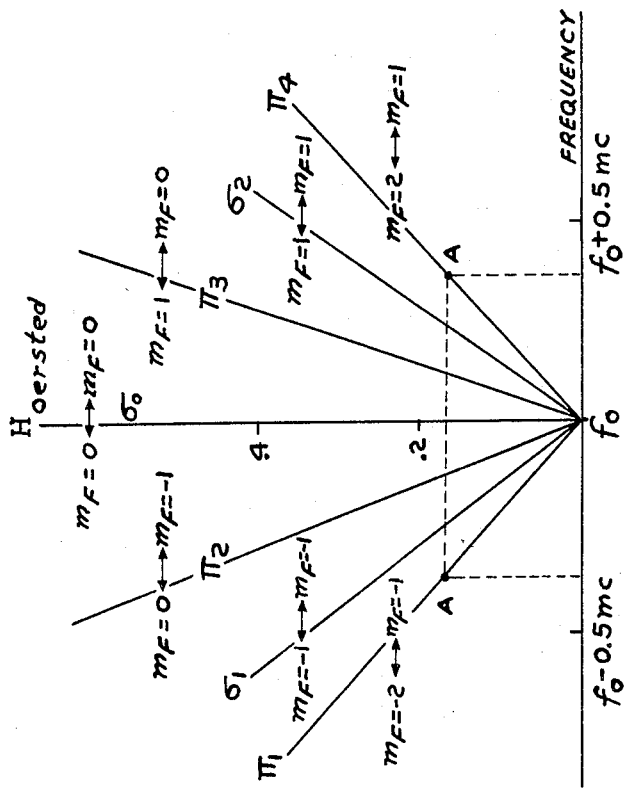
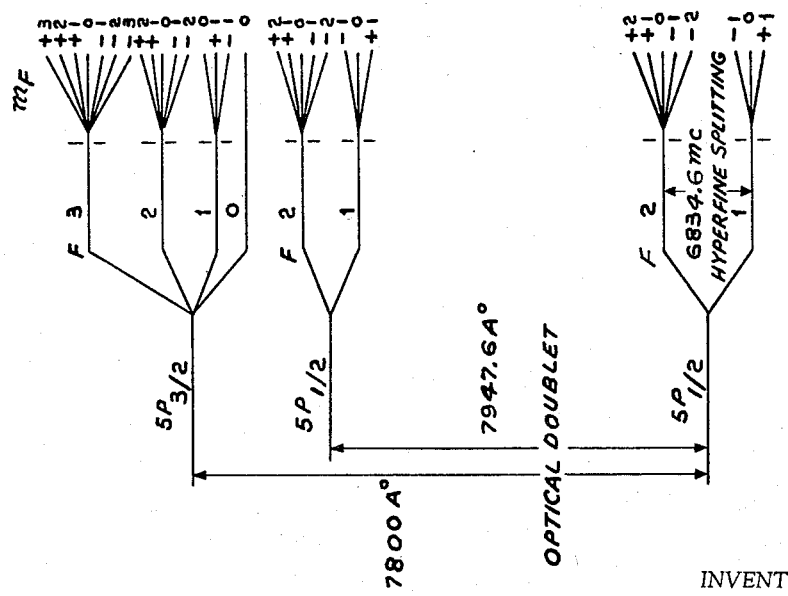

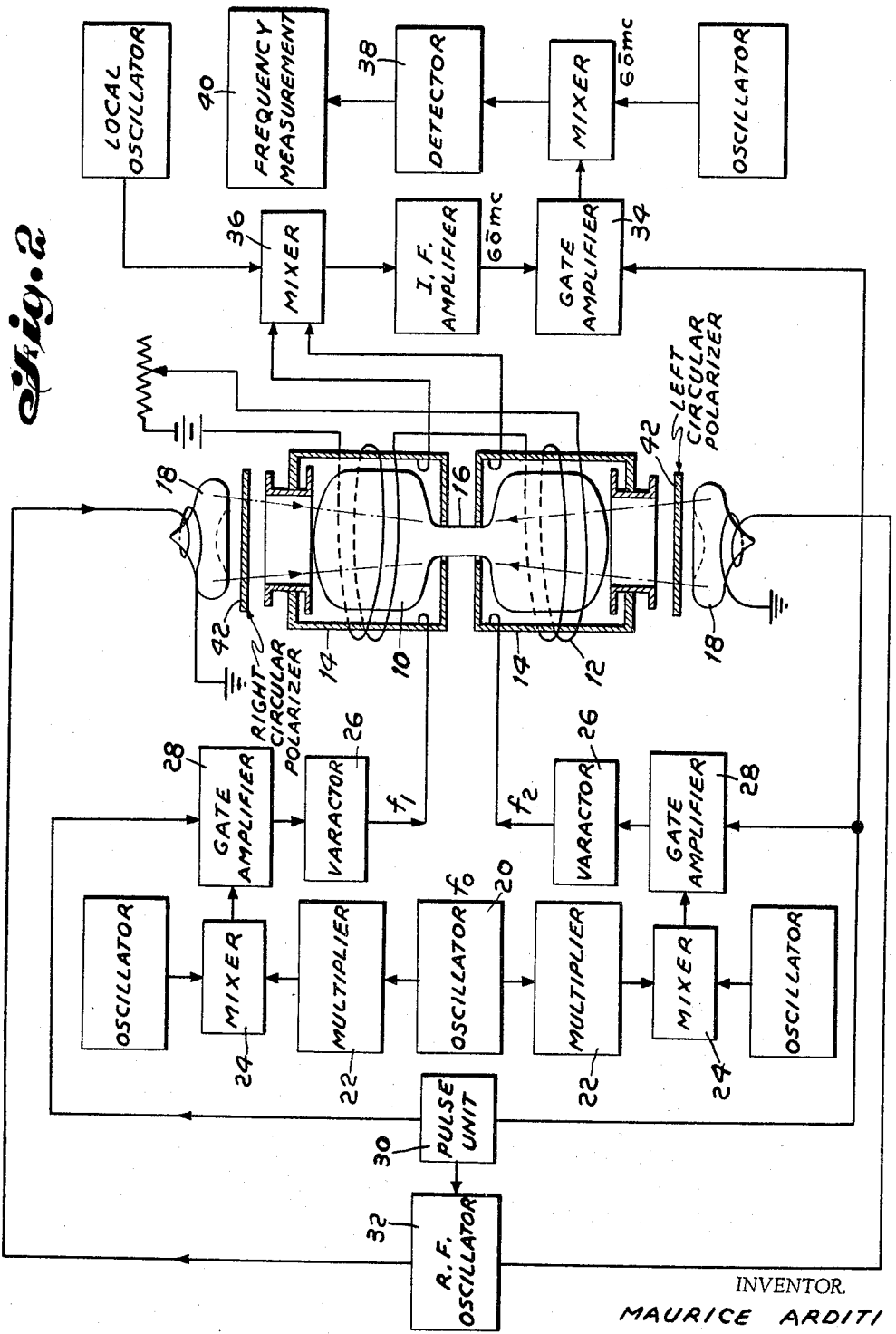

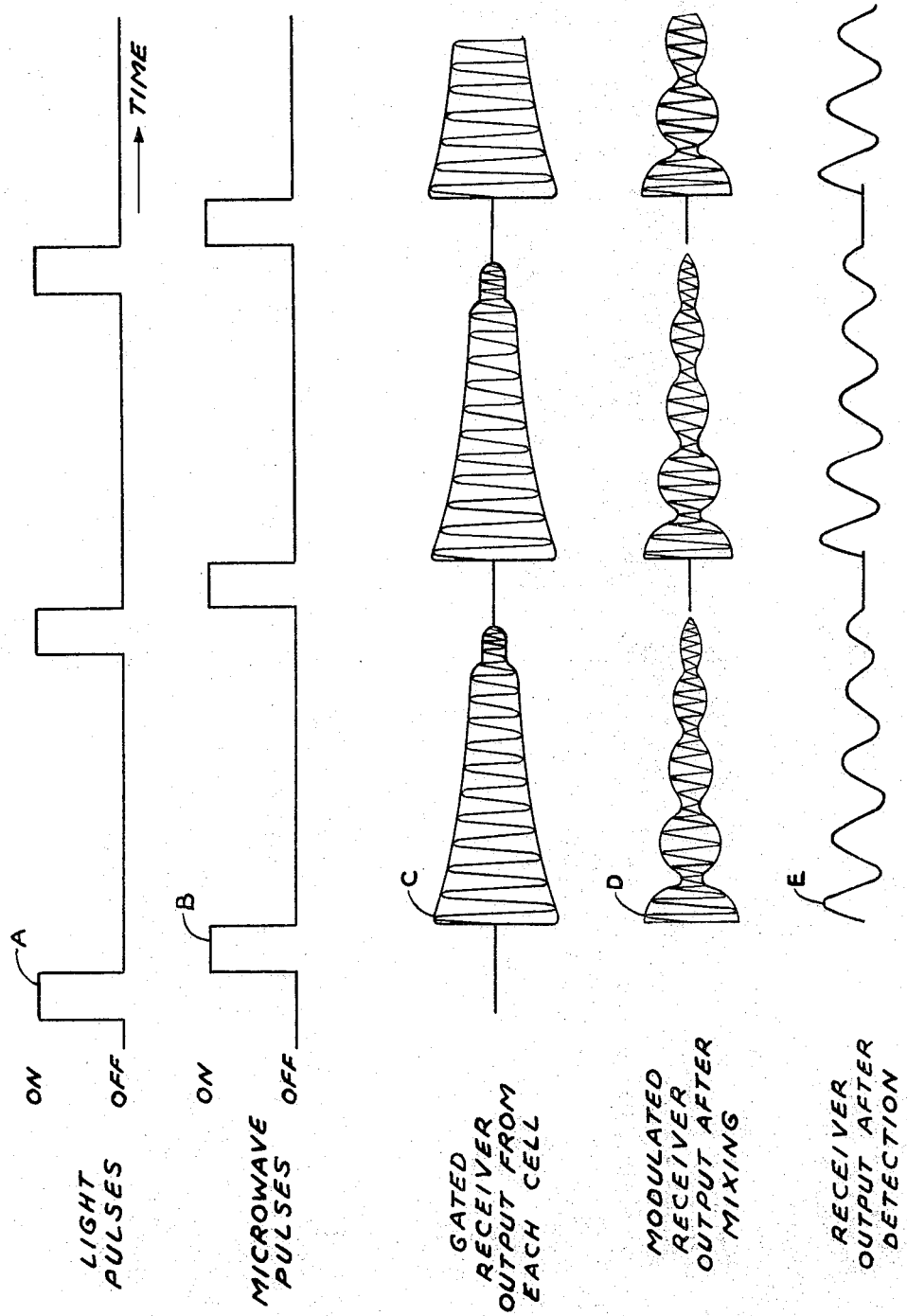

This invention relates to the use of optically pumped alkali vapor cells for the measurement of weak magnetic fields and particularly to a novel more stable system employing microwave pulse-induced emission to eliminate frequency variations occurring at different field orientations and frequency shifts caused by the light source.

Optical pumping of gas cells has been used to increase the sensitivity of the detection of molecular resonance of the gas by increasing the population differences between energy transition levels. As is well known, optical transmission of a gas cell changes with application of a resonance radio frequency field. Since the resonant frequency varies with the strength of the magnetic field, the quantity of light transmitted through the cell as detected by a photocell represents a means of the magnetic field strength. This effect has been employed in prior art instruments such as described by A. L. Bloom in a paper entitled "Principles of Operation of the Rubidium Vapor Magnetometer" published in Applied Optics, January 1962.

Most commercial units use low frequency Zeeman transitions either in self-oscillating magnetometers or in direct current devices with a feedback control system. The sensitivity of these devices is good but variations in absolute values of more than two orders of magnitude larger than the minimum detectable signal have been observed. This limit to absolute precision is due mainly to two effects; one being the shift in frequency caused by variation in the intensity of the light used for optical pumping. This difficulty is minimized by using high pressure buffer gases in the cell and by a system of microwave pulse induced emission, as described in further detail in copending application, Serial No. 353,394, entitled "High Stability Gas Cell Frequency Standard," filed March 20, 1964, now Patent No. 3,234,483, by the same inventor and assigned to the same assignee as the instant application. The second and more serious effect is a variation with orientation due to the structure of the Zeeman transition in the earths field and strong relaxation produced by the pumping light. With a usual line width of about one hundred cycles per second due to the incident light, the low frequency Zeeman components of a given hyper-fine sublevel are not resolved, and because of their different intensities, give rise to an asymmetric broad resonance line. As the relative intensities of the components change with the orientation in a magnetic field, a shift in the output frequency will occur. Such shifts have been corrected by a balanced two cell arrangement, but this requires perfect symmetry of components and geometry. Use of the microwave pulse induced emission system, however, provides microwave transitions which are well separated in the earths field so that a magnetometer utilizing such higher frequency transitions will also eliminate the second difficulty.

It is therefore the primary object of the present invention to provide an improved reliable gas cell magnetometer.

A further object is to increase the stability of the gas cell magnetometer by eliminating frequency shifts caused by the pumping light and by changes in orientation with respect to the magnetic field.

These results are achieved by a novel system utilizing microwave pulse-induced emission to provide microwave transitions at a characteristic frequency between selected energy levels in the hyperfine levels of the vapor in the stable ground state. The levels are selected so that the resonant frequency varies linearly with the magnetic field while the frequency difference between the levels at a given value of magnetic field remains constant despite variations of the hyperfine splitting at zero field. The latter variations may be due to changes in ambient conditions, such as gas pressure, temperature, etc. The present arrangement includes a gas cell excited by microwave pulses to induce microwave emission signals at two different frequencies. A receiver detects the difference signal between the two frequencies which is proportional to the magnetic field. The receiver is gated so that it is inoperative during the time of the pulse excitation and then detects the following induced emission signals. The optical pumping cycle is thus separated from the microwave detection cycle to avoid light shifts. The details of the invention will be more fully understood and other objects and advantages will become apparent in the following description wherein:

FIG. 1A shows the standard energy level diagram of rubidium 87 which may be used as the alkali vapor of the gas cell;

FIG. 1B shows the selected hyperfine transition levels of the ground state on an expanded scale as a plot of frequency versus magnetic field about a center resonant frequency at zero field;

FIG. 2 shows a block diagram of a system employing the present invention; and

FIG. 3 shows various pulse patterns appearing in related portions of the system.

As shown in FIGS. 1A and 1B the resonant frequency of a gas cell containing an alkali vapor, of which rubidium 87 is an example, varies linearly with the magnetic field for selected energy level transitions in the ground state. The microwave hyperfine transitions are achieved according to selection rules $\Delta F=1$, $\Delta m_f = \pm 1$ for $\pi$ polarization and $\Delta m_f = 0$ for $\sigma$ polarization. Frequencies of the various transitions are given by the well known Breit-Rabi formulas. The $\pi_1$ and $\pi_4$ transitions, as shown by the slope of the lines in FIG. 1B, correspond to the maximum sensitivity. The various lines are seen to be very symmetrical about the value of the resonant frequency $f_0$ at zero magnetic field and the present system may operate with any two transitions of lesser slope. It is to be noted that the frequency difference, as shown by dashed line A—A between the transition lines, remains constant for a given magnetic field despite variations of the resonant frequency at zero field which may occur due to changes in ambient conditions such as temperature or gas pressure.

As shown in FIG. 2, a gas cell 10 filled with an alkali vapor such as rubidium, and a noble buffer gas, is constructed so that each half of the cell is enclosed in a separate microwave cavity 14. The two halves of the cell are connected through a tubulation 16 so that the same pressure exists in both portions. Both cavities are also sufficiently compact and well thermostated to assume that the magnetic field intensity and temperature are also the same. Each half of the cell is optically pumped by a pulsed resonant light source 18, with each cavity being tuned to a different field sensitive transition. For example, one is tuned to the frequency corresponding to the $\pi_1$ transition, and the other to the $\pi_4$ frequency. Each cavity is then excited by a pulse of microwave energy at a frequency near the resonant frequency $\pi_1$ or $\pi_4$. The center frequency of the pulse need not necessarily be at the exact resonance frequency since a sufficiently short high energy pulse will provide enough microwave energy in a broad spectrum which includes the resonance frequency. This system thus avoids the requirement of complex frequency synthesizers.

The excitation pulse is produced by a common oscillator 20 which is coupled to separate frequency multipliers 22, mixers 24 and two varactor harmonic generators 26. A gated amplifier 28 before each varactor permits the proper timing of the microwave pulses from a common pulse unit generator 30. The pulse generator 30 also controls the timing of the radio frequency generator 32 exciting the lights and a gate 34 in a receiver. The receiver is made inoperative during the time of the pulse excitation and is reactivated at the end of the pulse to detect the resultant microwave induced emission signals. As described in further detail in the aforementioned co-pending application, Serial No. 353,394, light shifts are avoided by separating the optical pumping cycle in time from the microwave detection cycle. This effect is indicated in FIG. 3 by a timing sequence of video pulses A controlling the light, the microwave excitation pulses B occurring after the light pulse and the induced emission signals C in the receiver at the end of the microwave and gating pulses.

The microwave induced emission signals from the two cells are fed into the input mixer stage 36 of a superheterodyne receiver the output of which includes a difference frequency signal. After further mixing to increase the signal to noise ratio, a signal D modulated by the difference frequency is obtained. The modulated signal is then passed through a detector stage 38 which provides a low frequency difference or beat signal E which is directly proportional to the magnetic field measured. The output beat frequency can be measured by any suitable device 40, such as an oscilloscope with a calibrated time base or an electronic counter which counts the number of periodic zero crossings in a given interval.

In some cases in order to measure very small fields it is desirable to use a D.C. bias magnetic field, such as supplied by Helmholtz coils 12, which establish a fixed field uniformity. The field sensitive transition can then be made sufficiently narrow to give a pulse induced emission signal. This is necessary since signal strength of the induced emission is a function of the relaxation time of the atoms in the cell and in the case of field dependent transitions a major cause of shortened relaxation is the field inhomogeneities in the region of the cell. In addition, in order to provide increased signals from the $\pi_1$ and $\pi_4$ microwave transitions, left or right circular polarizers 42 may be used in series with the light source 18. While only the use of rubidium has been referred to in the above description, the same system may also be applied to other alkali atoms having magnetic transitions such as hydrogen, potassium, sodium or cesium.

The novel system of the present invention thus has the advantages of eliminating light shifts and the asymmetry of the low frequency Zeeman resonance. The pulse induced emission can be excited by a pulse whose center frequency is not necessarily at the resonance frequency. In addition, low fields can be measured with good sensitivity and precision in absolute value, since the frequency of the induced emission is practically insensitive to frequency pulling by the tuning of the microwave cavity and the measurements are made at very high frequencies with results independent of pressure or temperature of the cell within large limits.

While only a single embodiment has been illustrated, it is apparent that the invention is not limited to the exact form or use shown and that many other variations may be made in the particular design and configuration without departing from the scope of the invention as set forth in the appended claims.

What is claimed is:

1. A gas cell system for measuring magnetic fields comprising
    a gas cell positioned in a magnetic field and including a vapor therein having a characteristic resonant frequency at zero magnetic field corresponding to predetermined energy level transitions,
    a source of radio frequency energy supplying microwave signals close to said resonant frequency,
    means coupled to said source to supply pulses of two different microwave frequencies close to said resonant frequency, said frequencies varying linearly with said magnetic field,
    microwave cavity means coupled to said gas cell to apply said pulses of two different frequencies to simultaneously excite said energy transitions in two different regions of said cell and to produce corresponding microwave induced emission signals at the end of said pulses, said regions being at substantially the same magnetic field and temperature,
    optical pumping means providing light pulses to said gas cell in uniform sequence with said microwave pulses, said light pulses being terminated before the end of said microwave pulses and said induced emission signals being produced during the absence of said light pulses,
    microwave receiver means to combine said induced emission signals from said two different regions and detect a difference signal therebetween, the frequency of said difference signal being proportional to the strength of said magnetic field, and
    means for measuring said frequency difference.

2. The device of claim 1 including pulse and gating means for uniformly sequencing said microwave and light pulses and for deactivating said receiver during the occurrence of said microwave pulses.

3. The device of claim 2 wherein said gas cell is formed of two portions connected by a common tubulation, each portion being enclosed in a separate microwave cavity, each cavity being tuned to one of said two different frequencies, and said optical pumping means providing said light pulses to each said portion.

4. The device of claim 3 including D.C. bias means establishing a uniform magnetic field about said gas cell.

5. The device of claim 4 including circular polarizer means at each said portion between said optical pumping means and said cell.

6. The device of claim 5 wherein said gas cell contains a vapor of the group consisting of hydrogen, potassium, sodium, rubidium or cesium.

References Cited by the Examiner

UNITED STATES PATENTS

| | | | |
|---|---|---|---|
| 2,996,657 | 8/1961 | Varian | 324—0.5 |
| 3,129,389 | 4/1964 | Packard et al. | 331—3 |
| 3,157,837 | 11/1964 | Andres | 324—0.5 |

WALTER L. CARLSON, *Primary Examiner.*

CHESTER L. JUSTUS, *Examiner.*

M. R. WILBUR, A. E. RICHMOND,
*Assistant Examiners.*